United States Patent
Bond, Jr. et al.

(10) Patent No.: US 10,907,758 B2
(45) Date of Patent: *Feb. 2, 2021

(54) HIGH PRESSURE PIPE AND FITTING RESTRAINT SYSTEM

(71) Applicant: GULFSTREAM SERVICES, INC., Houma, LA (US)

(72) Inventors: Robert Bond, Jr., Houma, LA (US); Michael Mire, Houma, LA (US)

(73) Assignee: GULFSTREAM SERVICES, INC., Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,613

(22) Filed: Aug. 8, 2019

(65) Prior Publication Data
US 2020/0032943 A1 Jan. 30, 2020

Related U.S. Application Data

(63) Continuation of application No. 15/925,539, filed on Mar. 19, 2018, now Pat. No. 10,415,736, which is a continuation of application No. 14/765,768, filed as application No. PCT/US2014/014808 on Feb. 5, 2014, now Pat. No. 9,920,870.

(60) Provisional application No. 61/760,956, filed on Feb. 5, 2013.

(51) Int. Cl.
| F16L 55/00 | (2006.01) |
| F16L 13/04 | (2006.01) |
| F16L 57/00 | (2006.01) |
| F16L 3/26 | (2006.01) |
| F16L 35/00 | (2006.01) |
| F16L 3/14 | (2006.01) |

(52) U.S. Cl.
CPC ............... *F16L 55/005* (2013.01); *F16L 3/14* (2013.01); *F16L 3/26* (2013.01); *F16L 13/04* (2013.01); *F16L 35/00* (2013.01); *F16L 57/00* (2013.01)

(58) Field of Classification Search
CPC .......... F16L 55/005; F16L 35/00; F16L 3/26; F16L 3/14; F16L 13/04; F16L 57/00
See application file for complete search history.

(56) References Cited

U.S. PATENT DOCUMENTS

| 2,746,773 A | * | 5/1956 | Bily ...................... F16L 55/005 |
| | | | 285/117 |
| 3,197,240 A | * | 7/1965 | Lindberg .............. F16L 55/005 |
| | | | 285/114 |
| 3,360,838 A | * | 1/1968 | Comer ................. D02G 1/0266 |
| | | | 28/154 |

(Continued)

FOREIGN PATENT DOCUMENTS

WO    WO-2009043386 A1 * 4/2009   ............ F16L 55/005

*Primary Examiner* — Eret C Mcnichols
(74) *Attorney, Agent, or Firm* — Garvey, Smith & Nehrbass, Patent Attorneys, L.L.C.; Charles C. Garvey, Jr.; Julie R. Chanvin

(57) ABSTRACT

A restraint system for use in securing temporary flow lines that include multiple pipe sections, each pair of pipe sections connected together with a fitting or coupling such as a hammer joint coupling. The system includes multiple pluralities of endless loop slings connected end to end with a cow hitch or girth hitch knot. Disconnectable fittings (e.g., shackles) are placed every three or more slings so that easy disassembly is afforded in case of leakage or other failure.

24 Claims, 7 Drawing Sheets

(56) References Cited

U.S. PATENT DOCUMENTS

| | | | | |
|---|---|---|---|---|
| 3,859,692 | A * | 1/1975 | Waterman | F16L 55/005 24/300 |
| 4,333,675 | A * | 6/1982 | Wirkkala | B66C 1/12 24/122.6 |
| 4,484,962 | A * | 11/1984 | Dienes | H02G 15/08 156/313 |
| 4,549,332 | A * | 10/1985 | Pouliot | F16L 55/005 24/115 H |
| 4,553,635 | A * | 11/1985 | Johnson | A01M 31/02 182/187 |
| 4,890,363 | A * | 1/1990 | Cross | F16L 55/005 24/129 R |
| 5,507,533 | A * | 4/1996 | Mumma | F16L 55/005 285/114 |
| 5,689,862 | A * | 11/1997 | Hayes | F16L 55/005 24/279 |
| 5,873,608 | A * | 2/1999 | Tharp | F16L 55/005 285/114 |
| 6,192,558 | B1 * | 2/2001 | Badura | F16B 45/02 24/599.1 |
| 6,298,882 | B1 * | 10/2001 | Hayes | F16L 55/005 138/110 |
| 6,481,457 | B2 * | 11/2002 | Hayes | F16L 55/005 137/377 |
| 6,596,015 | B1 * | 7/2003 | Pitt | A61B 17/0469 606/232 |
| 6,837,523 | B2 * | 1/2005 | Surjaatmadja | F16L 57/00 285/1 |
| 7,568,333 | B2 * | 8/2009 | St. Germain | D07B 7/14 57/201 |
| 7,802,823 | B2 * | 9/2010 | Piantoni | F16L 55/005 285/114 |
| 8,132,595 | B2 * | 3/2012 | Gayaut | F16L 3/18 138/106 |
| 8,540,295 | B2 * | 9/2013 | Babinchak | B66C 1/18 294/74 |
| 8,689,534 | B1 * | 4/2014 | Chou | F16G 15/12 59/78 |
| 8,905,081 | B2 * | 12/2014 | Lee | F16L 55/005 138/106 |
| 8,991,031 | B2 * | 3/2015 | Meadows | F16L 35/00 285/117 |
| 2002/0095165 | A1 * | 7/2002 | Chan | A61B 17/0469 606/148 |
| 2002/0163184 | A1 * | 11/2002 | Blair | F16B 2/26 285/114 |
| 2003/0036345 | A1 * | 2/2003 | Conner | A22B 5/06 452/187 |
| 2010/0077718 | A1 * | 4/2010 | Wienke | B66C 1/125 59/84 |
| 2010/0244437 | A1 * | 9/2010 | O'Neil | F16L 43/02 285/104 |
| 2011/0298231 | A1 * | 12/2011 | Dohse | B66C 1/12 294/74 |
| 2013/0248004 | A1 * | 9/2013 | Money | F16L 55/005 137/15.08 |
| 2013/0319565 | A1 * | 12/2013 | St. Germain, Jr. | F16L 3/04 138/106 |
| 2015/0167868 | A1 * | 6/2015 | Boncha | F16L 11/10 138/134 |
| 2015/0176736 | A1 * | 6/2015 | O'Neil | F16L 43/02 285/81 |
| 2015/0192233 | A1 * | 7/2015 | Meadows | F16L 35/00 285/117 |
| 2018/0224025 | A1 * | 8/2018 | Harris | F16L 3/02 |

* cited by examiner

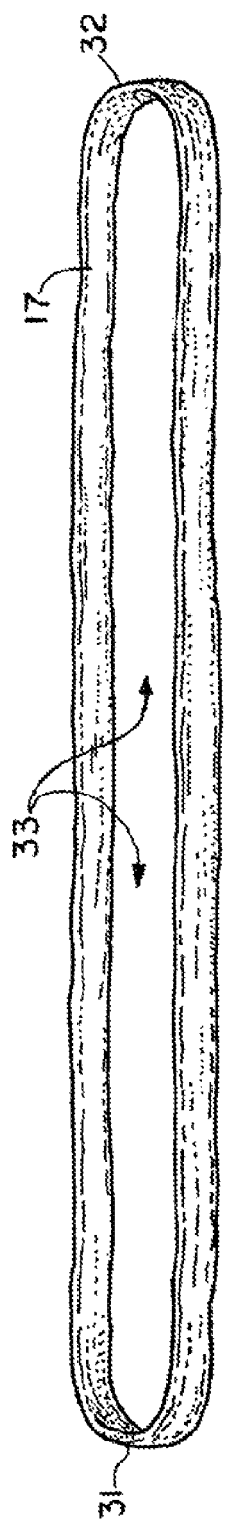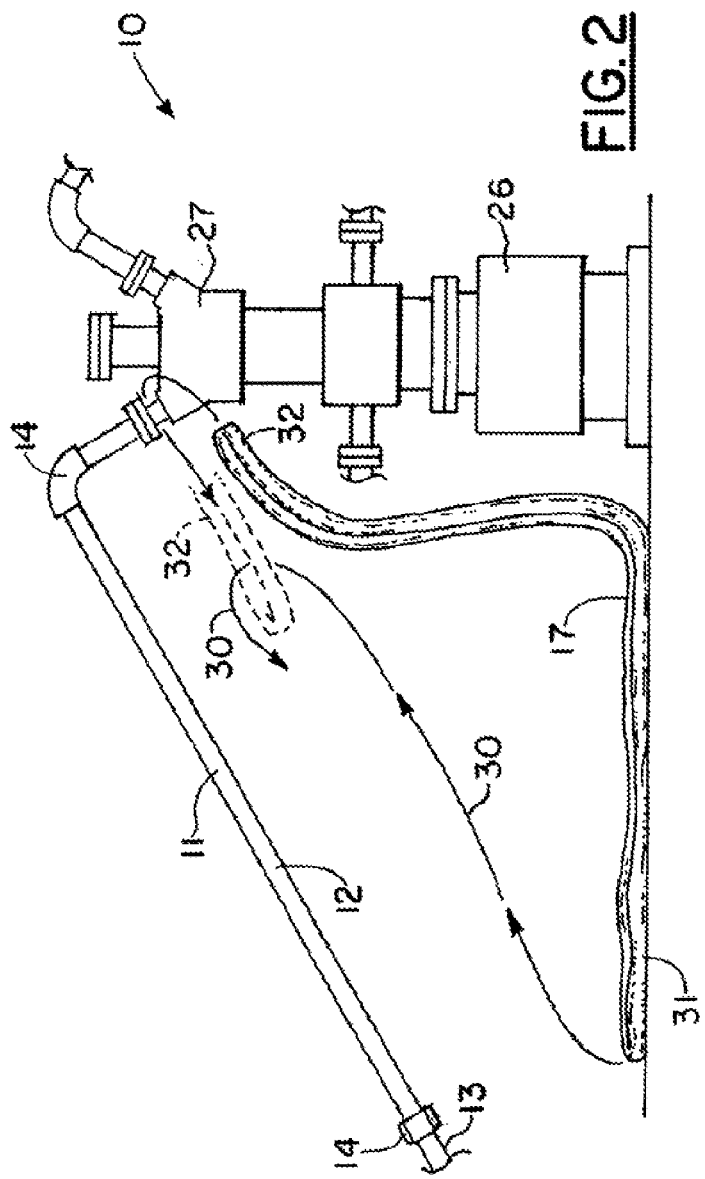

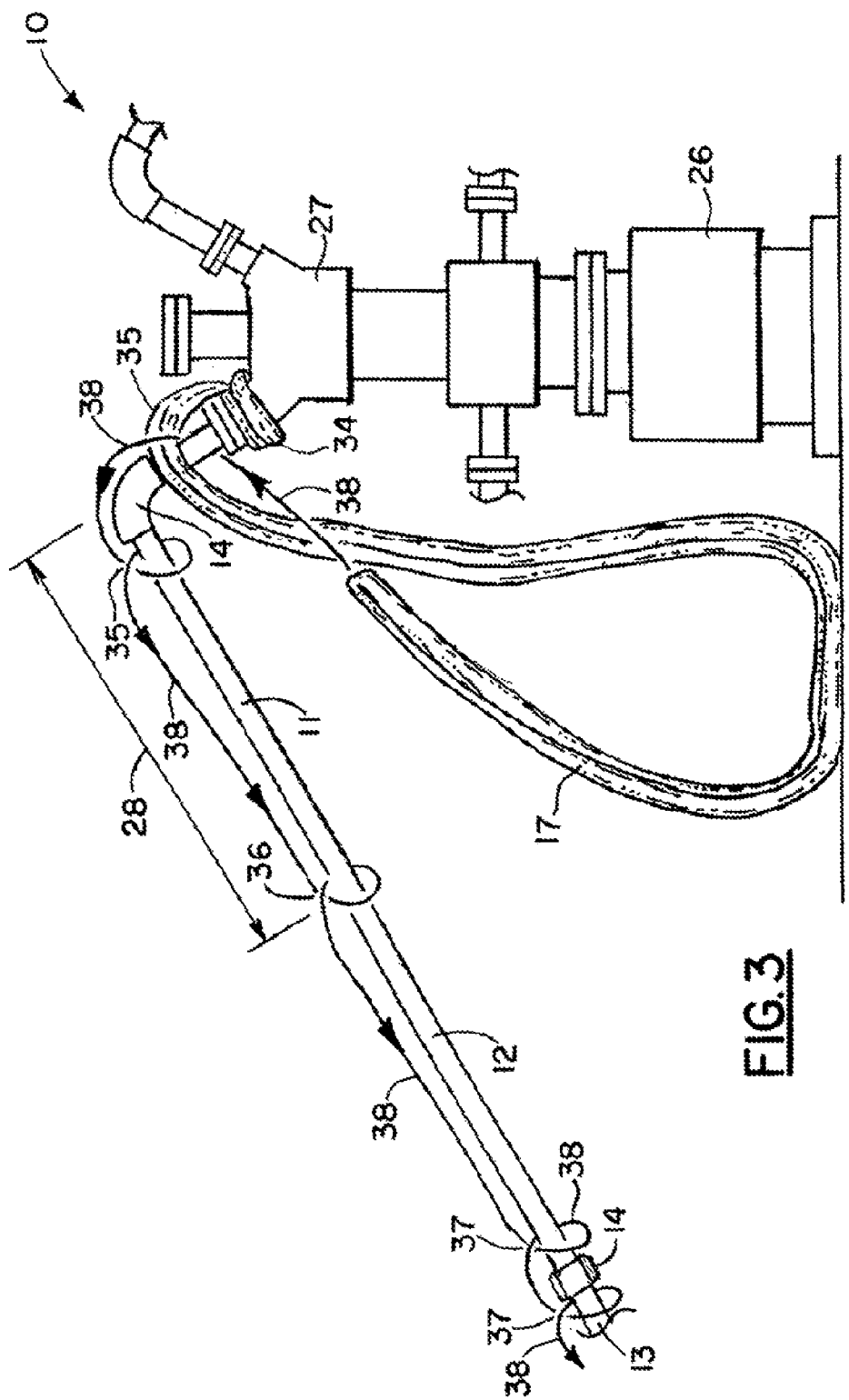

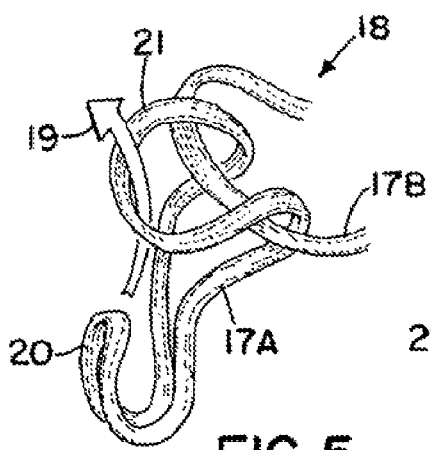
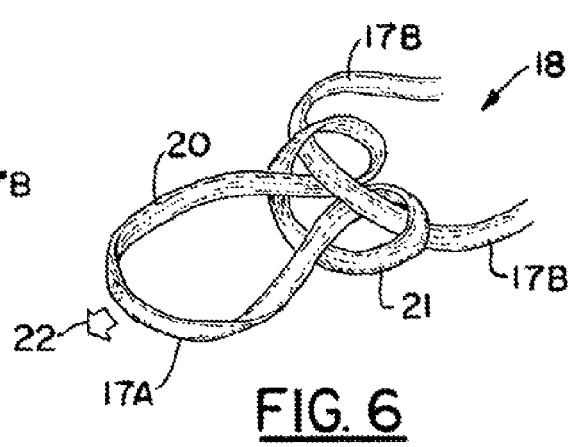
FIG. 5    FIG. 6
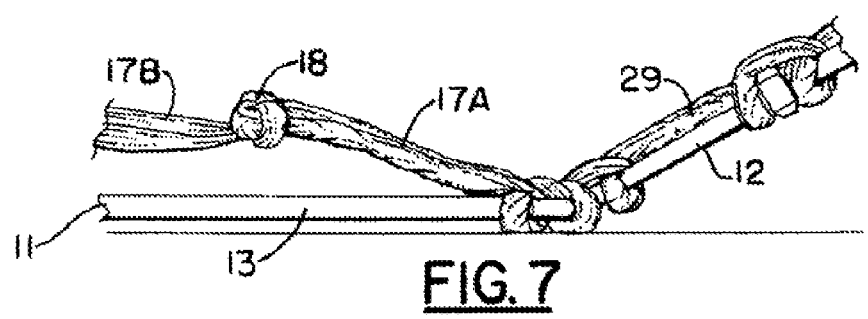
FIG. 7
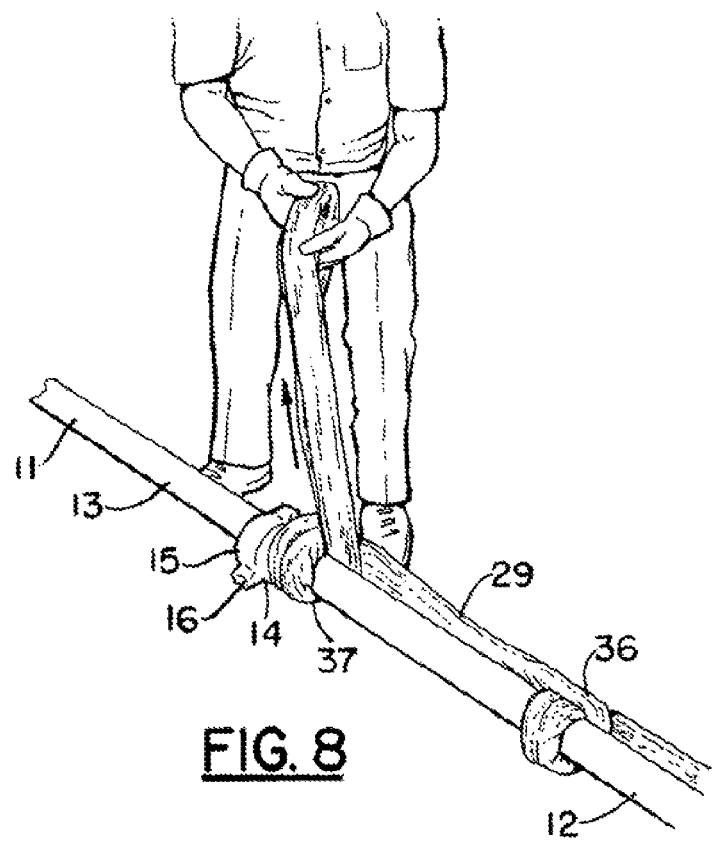
FIG. 8

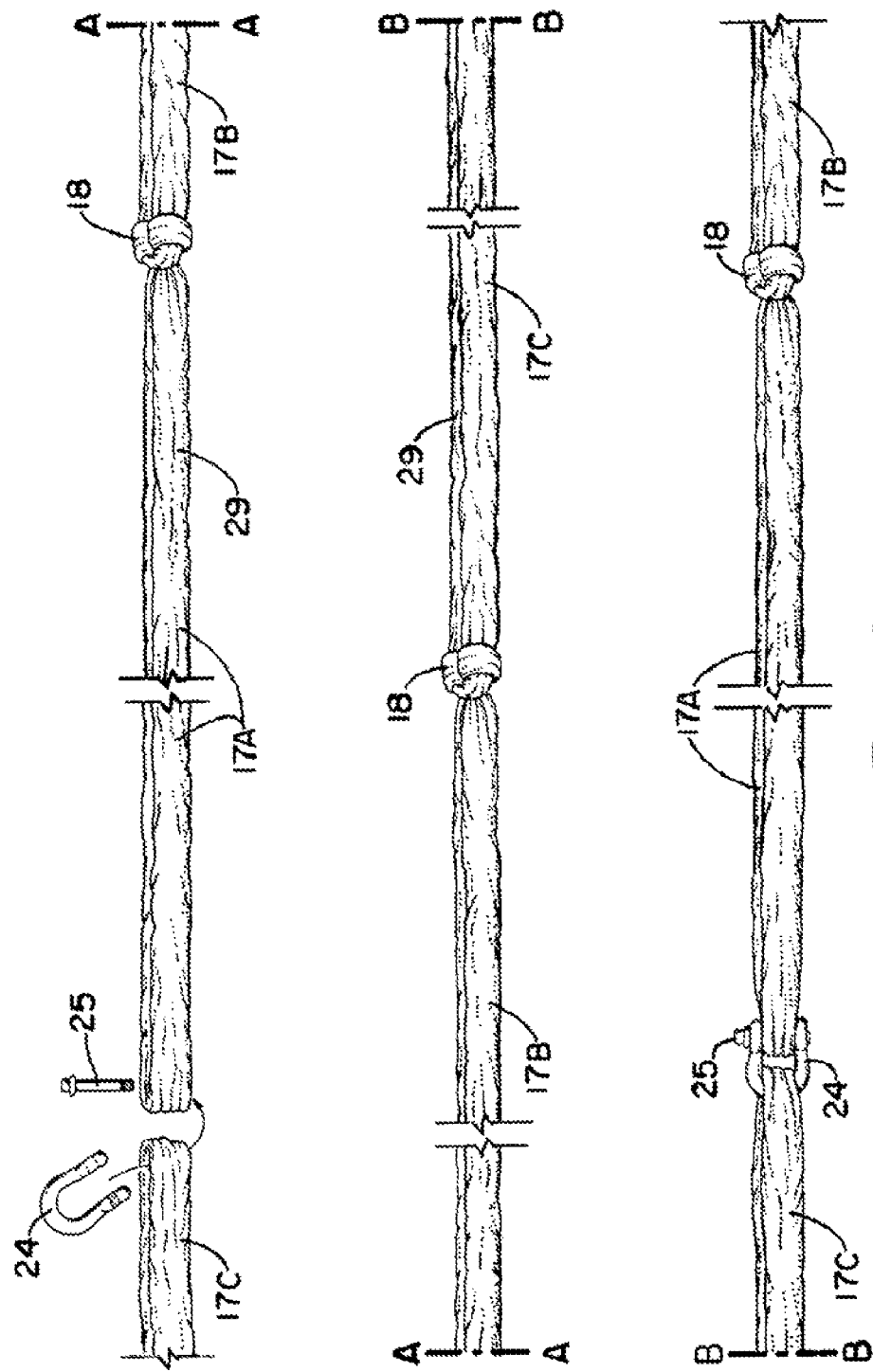

HIGH PRESSURE PIPE AND FITTING RESTRAINT SYSTEM

CROSS-REFERENCE TO RELATED APPLICATIONS

This application is a continuation of U.S. patent application Ser. No. 15/925,539, filed 19 Mar. 2018 (issued as U.S. Pat. No. 10,415,736 on 17 Sep. 2019), which is a continuation of U.S. patent application Ser. No. 14/765,768, filed 4 Aug. 2015 (issued as U.S. Pat. No. 9,920,870 on 20 Mar. 2018), which is a 371 of International Application Serial No. PCT/US2014/014808, filed 5 Feb. 2014, which claims the benefit of U.S. Provisional Patent Application Ser. No. 61/760,956, filed 5 Feb. 2013, each of which is hereby incorporated herein by reference and priority to each of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to devices for restraining, restricting, or arresting movement of temporary piping such as high pressure pipeline or flow lines during a catastrophic failure. More particularly, the present invention relates to a method and apparatus for restraining high pressure pipe and fittings wherein a series of endless loop slings are joined end to end with hitch type connections (such as a cow hitch, sling hitch, lanyard hitch or other like knot) and wherein each of first and second lengths of assembled slings are connected end to end with disconnectable connections (e.g., shackles) that enable service or maintenance of a selected section of the high pressure piping system without disassembly of all of the endless loop slings, and wherein the assembly of slings and connectors is knotted to the pipeline (e.g., with half hitch knots) at selected intervals.

2. General Background of the Invention

In the offshore oil and gas industry, temporary high pressure pipelines are often employed at or near a drilling platform or drilling rig or upon a deck of a drilling platform or drilling rig. These high pressure pipelines are assembled using couplings which are also high pressure rated. If one of these sections of pipe or coupling that make up the high pressure flow line fail or leak, the pipe can violently move, potentially causing injury or death to personnel and/or damage to equipment. For example, pipe sections can come completely apart when a failure occurs.

Patents have issued for restraint systems designed to restrain a flow line or parts thereof. The following are examples of such patents:

U.S. Pat. Nos. 2,746,773; 5,689,862; 6,481,457 (wherein each of these patents is hereby incorporated herein by reference).

The '457 Patent is directed to a "Safety Restraint Assembly for High Pressure Flow Line". The patent is owned by S.P.M. Flow Controls, Inc. of Fort Worth, Tex. (hereinafter "S.P.M.").

A Society of Petroleum Engineers publication which is identified by the numeral SPE 24619 and entitled "Restraining System to Help Contain Well Flow Lines and Equipment During Rupture for Increased Safety" was said to have been prepared for presentation at the 87th Annual Technical Conferences and Exhibition of the Society of Petroleum Engineers held in Washington, D.C., 4-7 Oct. 1992.

BRIEF SUMMARY OF THE INVENTION

The present invention provides a restraint system for use in securing temporary flow lines that include multiple pipe sections, each pair of sections connected together with a fitting such as a pressure holding coupling (e.g., a hammer union or coupling).

The present invention thus provides a restraint system for use in securing temporary flowlines that include multiple pipe sections, each pair of pipe sections connected together with fittings. Such temporary piping systems are commonly used in sizes/diameters 2 inch (5.08 centimeters), 3 inch (7.62 centimeters), 4 inch (10.16 centimeters) as examples. The system includes an assembly of polyester round slings, round slings or loop slings (preferably endless loop slings) connected end-to-end, each sling having end portions that are secured to one or more other endless slings. The loops or slings can be synthetic round slings as defined by ASME B30.9. Core yarns of each sling can be of a synthetic fiber. Covers of the slings can be woven from synthetic yarns. The synthetic round slings can be fabricated from core yarns wound together with multiple turns and enclosed in a protective cover(s). The cover and core can be of the same type of material. When the core and cover are of a different type, the thread should be as the same type yarn as the core. Stitching, if used, should be of the type to prevent unraveling.

Disconnectable fittings join one assembly of multiple slings to another assembly of multiple slings.

The disconnectable fitting is not a part of a sling.

In one embodiment, the disconnectable fitting can be a shackle.

In one embodiment, each endless sling is wrapped around the piping system at least one 360° wrap.

In one embodiment, there are at least three endless loop slings in each assembly.

In one embodiment, each endless loop sling assembly encircles a pipe section next to a fitting.

The present invention provides a method for restraining a temporary flow line that includes multiple pipe sections, each pair of sections connected together with a disconnectable coupling.

The method provides first and second pluralities of connected endless sling loops, each plurality including at least three endless loop slings connected end to end with a cow hitch, girth hitch or sling hitch or other hitch knot.

The endless loop slings are connected end to end and connecting each plurality to another plurality with a disconnectable connector.

In one embodiment, the disconnected connector is not a part of an endless sling.

In one embodiment, the connector is metallic.

In one embodiment, the connector is a shackle.

In one embodiment, the connector is a fitting having two parts, one part that disconnects from the other part.

The present invention provides a restraint system for use in securing temporary flowlines that include multiple pipe sections, each pair of sections connected together with fittings. An assembly of endless loop slings are connected end-to-end, each sling having end portions that are secured to one or more other endless slings.

Disconnectable fittings join one assembly of multiple endless slings to another assembly of multiple endless slings;

The disconnectable fitting is not a part of an endless loop sling.

The assembly of flowlines is connected at intervals to the pipe sections and fittings using knotted connectors.

In one embodiment, the disconnectable fitting is a shackle.

In one embodiment, each endless sling is tied to the piping system with half hitch knots.

In one embodiment, there are between 2 and 12 endless loop slings in each assembly.

In one embodiment, each endless loop sling assembly is tied to a pipe section next to a fitting.

The present invention provides a method for restraining a temporary flow line that includes multiple pipe sections, each pair of sections connected together with a disconnectable coupling, the system providing first and second pluralities of connected endless sling loops.

Each plurality includes at least three endless loop slings connected end to end with a knotted connection.

The slings are connected end to end connecting each plurality to another plurality with a disconnectable connector.

The slings are knotted to the flow line at intervals using half hitch or other knotted connections.

In one embodiment, the disconnected connector is not a part of an endless sling.

In one embodiment, the connector is metallic.

In one embodiment, the connector is a shackle.

In one embodiment, the connector is a fitting having two parts, one part that disconnects from the other part. In one embodiment the two parts are a shackle bow and a shackle pin.

Anchors can be used to anchor the extreme ends of the slings or loops or round slings. Such an anchor can be a pump truck, well head, immovable object. The connection to the immovable object can be a choke hitch or shackle.

The polyester round slings are used to form a hitch connection parallel to the piping installation, with hitch connections before and after each pipe connection/swivel and at regular intervals (e.g. five feet (1.524 meters)) on straight joints of pipe. At the end of a run of several slings connected end to end, the last sling is connected to an immovable object such as a well head or other immovable object using a shackle or like structural connector.

The present invention includes a restraint system for use in securing temporary flowlines that include multiple pipe sections, each pair of sections connected together with one or more fittings. The system can include an assembly of multiple endless loop slings connected end-to-end, one sling having end portions, an end portion secured to one or more of said other slings with a cow hitch knot connection. A plurality of disconnectable fittings can each join one assembly of multiple slings to another assembly of multiple slings. The disconnectable fitting is not a said sling. The slings can be attached to the assembly of pipe sections and fittings with knots at spaced apart positions.

In one embodiment, the disconnectable fitting can be a shackle.

In one embodiment, the knot can include a wrap of a said sling around the piping system at least one 360° wrap.

In one embodiment, each sling assembly can include three or more endless loop slings in each assembly.

In one embodiment, the said knot can secure each endless loop sling assembly to the pipe section encircling the pipe multiple times next to a said fitting.

In one embodiment, each sling assembly can include a sling that connects to two other side slings with first and second spaced apart cow hitch knots.

In one embodiment, there can be multiple spaced apart fittings and the assembly of endless loop slings encircles a pipe section multiple times in between two of said spaced apart fittings.

In one embodiment, the assembly of endless loop slings can encircle a said fitting multiple times and on opposing sides of said fitting.

In one embodiment, the slings can be of differing lengths.

In one embodiment, the slings can be of differing thicknesses.

The present invention includes a method for restraining a temporary flow line that includes multiple pipe sections, each pair of sections connected together with a disconnectable coupling. The method includes providing first and second sling assemblies, each assembly comprising multiple endless sling loops connected to one another. Each sling assembly can include at least three endless loop slings connected end to end, one of the endless loop slings being a middle sling that connects at spaced apart positions with a girth hitch knot joining one said sling to another said sling. The endless loop slings can be connected end to end connecting each plurality to another plurality with a disconnectable connector. The slings can be attached to the assembly of pipe sections and fittings with knots.

In one embodiment, the disconnectable connector is not a part of an endless sling.

In one embodiment, the connector can be metallic.

In one embodiment, the connector can be a shackle.

In one embodiment, the connector can be a fitting having two parts, one part that disconnects from the other part.

The present invention includes a restraint system for use in securing temporary flowlines that include multiple pipe sections, each pair of sections connected together with fittings. The system can have multiple assemblies of endless loop slings connected end-to-end, each assembly defined by one sling having an end portion that is secured to one or more other endless slings with a cow hitch knot. Disconnectable fittings can join one said assembly of multiple endless slings to another assembly of multiple endless slings, wherein the disconnectable fitting is not a said endless loop sling. The system further includes attaching the assemblies to the flowlines at intervals using a combination of knotted connectors that each encircle the flowline.

In one embodiment, the disconnectable fitting can be a shackle.

In one embodiment, each endless sling can be tied to the piping system at with half hitch knots.

In one embodiment, there can be between 2 and 12 endless loop slings in each assembly.

In one embodiment, each endless loop sling assembly can be tied to a pipe section next to a fitting.

The present invention includes a method for restraining a temporary flow line that includes multiple pipe sections, each pair of sections connected together with a disconnectable coupling. The method includes providing multiple assemblies of connected endless sling loops. Each plurality can include at least three endless loop slings connected end to end with each sling attached to another said sling with a girth hitch knot. The assemblies can be connected end to end, one assembly connecting to another assembly with a disconnectable connector. The method can include knotting the slings to the flow line at intervals.

In one embodiment, the disconnectable connector is not a part of an endless sling.

In one embodiment, the connector can be metallic.

In one embodiment, the connector can be shackle.

In one embodiment, the connector can be a fitting having two parts, one part that disconnects from the other part.

In one embodiment, the slings can be of differing lengths.

In one embodiment, the slings can be of differing diameters.

In one embodiment, the slings can be of a polyester material.

In one embodiment, the slings can be of a synthetic fiber material.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a perspective view of a preferred embodiment of the apparatus of the present invention illustrating one of the loop sling portions thereof;

FIG. 2 is an elevation view illustrating a part of the method of the present invention;

FIG. 3 is an elevation view illustrating a part of the method of the present invention;

FIG. 5 is a fragmentary view illustrating a connection used to join one endless loop sling to another endless loop sling as part of the method of the present invention;

FIG. 6 is an fragmentary view illustrating a part of the method of the present invention;

FIG. 7 is an elevation view illustrating a part of the method of the present invention;

FIG. 8 is an elevation view illustrating a part of the method of the present invention;

FIG. 16 is a partial view of a preferred embodiment of the apparatus of the present invention illustrating a sling assembly as used with the method of the present invention.

DETAILED DESCRIPTION OF THE INVENTION

Figure 4:
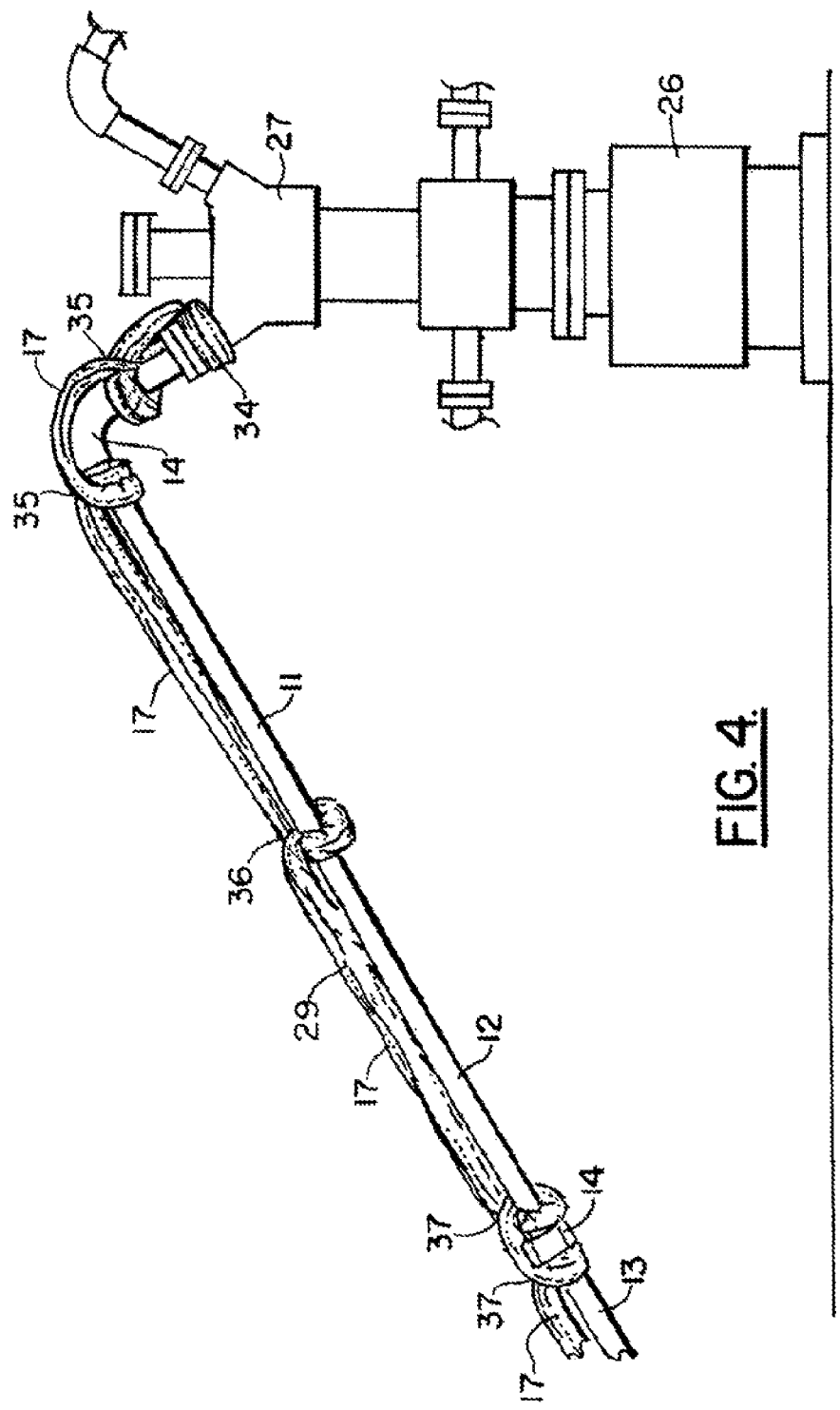
FIG. 4 is an elevation view illustrating a part of the method of the present invention.
Figure 9:
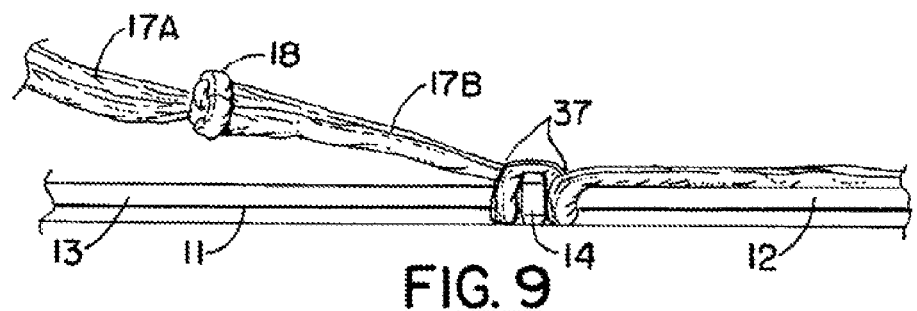
FIG. 9 is a fragmentary elevation view illustrating a connection of one loop sling to another loop sling using a shackle.
Figure 10:
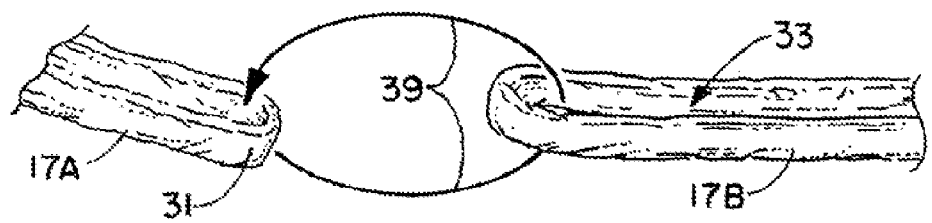
FIG. 10 is a fragmentary elevation view illustrating a connection of one loop sling to another loop sling using a shackle.

FIGS. 1-16 show a preferred embodiment of the apparatus of the present invention designated generally by the numeral 10 in FIGS. 2-4. Restraint system 10 is used to secure a high pressure flow line or pipeline 11 that can be comprised of a plurality of pipe sections 12, 13 and fittings 14 (e.g., couplings, valves, elbows, tees or other fittings).

Two (2) pipe sections 12, 13 are usually connected at fitting 14. However, the term "fitting" as used herein should be construed broadly to include anything that can be part of a piping system or flowline. "Fitting" as used herein includes but is not limited to an elbow, tee, reducer, valve, coupling, hammer union, union, as examples. In such a high pressure flow line 11, multiple pipe sections are typically connected end to end with fittings, unions or couplings. The flow line 11 can include multiple straight sections 12, 13 of pipe and elbow or bend sections, tee fittings, couplings, unions, and the like. Such temporary high pressure flow lines, fittings and pipe joints are well known in the art.

A fitting 14 (e.g., a coupling such as a hammer union 14, which is commercially available) can be used to join a pair of pipe sections 12, 13 together (see FIGS. 2 and 8). Such hammer unions, couplings or like fittings 14 are known in the art and commercially available. Coupling or fitting 14 can provide a hammer nut 15 having projections 16 which can be pounded with a hammer to insure a tight seal for the connection of coupling or fitting 14 when it is used to join two pipe sections 12, 13 together. An example of a hammer union and seal arrangement can be seen in U.S. Pat. No. 6,764,109 entitled "Hammer Union and Seal Therefor". U.S. Pat. No. 6,764,109 is hereby incorporated herein by reference.

In FIGS. 5-6, there can be seen a knotted connection, such as a cow hitch or girth hitch knot 18 that joins one endless loop sling 17A to another endless loop sling 17B and to a third sling 17C (see FIG. 16). The slings 17 can be connected end to end as seen in FIG. 16 to form a sling assembly 29 (e.g., two or three or four slings). Each sling 17 has ends 31, 32 and center 33. Every few slings, the connection is with a shackle 23 or other disconnectable connector. The knot 18 of FIGS. 5-6 and 16 can be perfected to connect two slings 17A, 17B together by forming a first loop 20 and passing it through a second loop 21 as indicated by arrow 19 and pulling the first loop 20 through the second loop 21 until knot 18 is formed as indicated by arrow 22. The assembled slings 17A, 17B connected with knot 18 can be seen in FIGS. 5-6 and 16.

Once two or more slings 17 are connected end to end as seen in FIGS. 7 and 16, an assembly of such slings 17 (e.g., three slings 17A, 17B, 17C connected end-to-end) is connected to another assembly of slings (e.g., three slings 17A, 17B, 17C connected end-to-end) with a disconnectable connector such as a shackle 23. Shackle 23 has two separable parts, bow 24 and pin 25. Such shackles are commercially available. In this fashion, if a leak is detected, only two shackles 23 next to or on opposing sides of the leak need be disconnected as opposed to all of the slings 17. This feature enables the disassembly of only a few slings instead of the dozens or even hundreds of slings that might be employed to restrain a high pressure pipeline or piping system.

The assemblies of slings 17A, 17B, 17C (e.g., three slings per assembly) are knotted to the pipe 11 and fittings 14 at selected intervals using half hitch or other knots (see FIGS. 2-4 and 7-16). In FIG. 2, an anchor 27 is provided that can be part of an immovable object such as wellhead 26. In order to install the restraint system 10 of the present invention on a high pressure flow line 11, pipeline or piping system, one end portion of a sling assembly 29 is attached to anchor 27 of wellhead 26. FIGS. 2 and 3 illustrate such an attachment. A half hitch or cow hitch knot 18 can be used to attach an assembly of slings 17A, 17B, 17C as shown in FIG. 16 to the anchor 27 shown in FIGS. 2 and 3. End 31 is looped through the center of end 32 as illustrated by arrows 30 in FIG. 2. The knotted connection to anchor 27 is designated by the numeral 34 in FIG. 3.

Once an assembly of slings 17A, 17B, 17C is connected to anchor 27 at connection 34, arrows 38 illustrate that the assembly 29 of slings is connected to the high pressure flow line 11 at intervals. At each connection to the pipeline 11, a knot can be used such as a hitch or half hitch knot 35. In FIG. 3, two half hitch or hitch knots 35 are used, one on each side of fitting 14 which fitting is an elbow in FIG. 3. For a length of pipe or section of pipe 12 or 13, half hitch or hitch knots 36 can be used at intervals (e.g., every five (5) feet (1.524 meters)) designated by the numeral 28 in FIG. 3. In FIG. 3, two more hitches or half hitch knots 37 are used on opposing sides of a fitting 14 which is a hammer union.

In FIGS. 4 and 7-9, the installation of an assembly 29 of endless loop slings 17A, 17B, 17C can be seen. Assembly 29 attaches to piping system 11 wherein knots 35, 36 and 37 having been completed. Once a first sling assembly 29 of for example two or three or more slings is affixed to the piping system 11 as shown in FIGS. 3 and 4, one sling assembly 29 of a plurality of slings 17 is then attached to another sling assembly 29 of a plurality of slings 17 using shackles as shown in FIG. 16. In this fashion, only one or two shackles 23 need be disconnected should a leak occur. User's could then repair the damaged pipe section 11 or 12 or the damaged fitting 14 and then attach a sling assembly or assemblies 29 with shackles 23.

Figure 11:
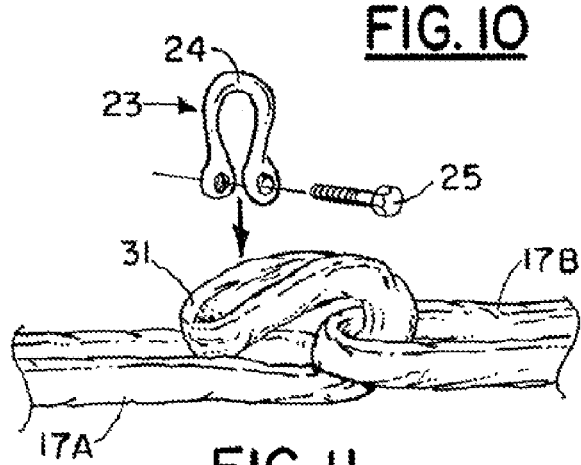
FIG. 11 is a fragmentary elevation view illustrating a connection of one loop sling to another loop sling using a shackle.
Figure 12:
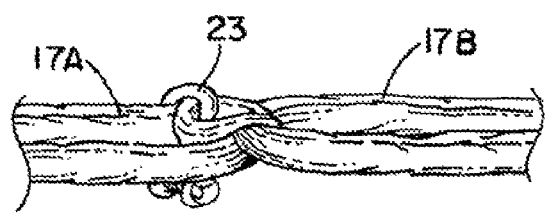
FIG. 12 is a fragmentary elevation view illustrating a connection of one loop sling to another loop sling using a shackle.
Figure 13:
FIG. 13 is a fragmentary elevation view illustrating a connection of one loop sling to another loop sling using a shackle.

FIGS. 10-13 show an alternate method of attaching one loop sling 17A to another loop sling 17B using shackle 23. In FIGS. 10-13, a first loop sling 17A is connected to a second loop sling 17B by routing the first loop sling 17A through the open center 33 of the second loop sling 17B as illustrated by arrow 39 in FIG. 10. An end 31 of the loop sling 17A is then fastened to the sling 17A using shackle 23 as shown in FIGS. 11-13.

Figure 14:
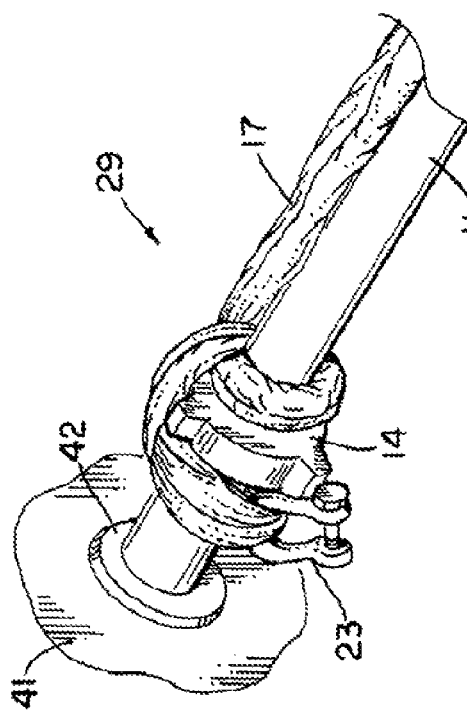
FIG. 14 is a partial perspective view illustrating the method of the present invention, illustrating an anchor at one end portion of a sling assembly.
Figure 15:
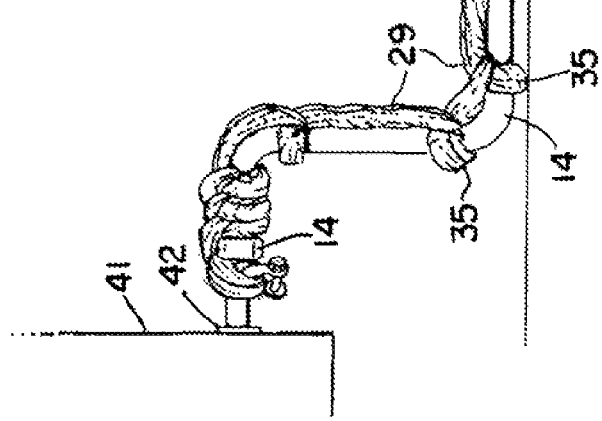
FIG. 15 is a partial perspective view illustrating the method of the present invention, illustrating an anchor at one end portion thereof.

FIGS. 14 and 15 show an alternate anchoring arrangement wherein the anchor 41 connects to the piping system or pipe line 11 at connection 42. In FIGS. 14 and 15, fitting 14 such as a hammer union is closely spaced to connection 42. A sling assembly 29 or sling 17 is connected to the pipe line 11 on opposing sides of the fitting or hammer union 14 with a shackle 23 connecting one portion of the sling 17 or sling assembly 29 to another portion of the sling or sling assembly 17, 29 in order to perfect an attachment of the sling assembly 29 to the pipe line 11 itself for providing an anchor at one end portion of the sling assembly 29. The sling assembly is attached to the piping system or pipe line 11 using hitch knots or half hitch knots 35, 36, 37 as with the embodiment of FIG. 4.

The following is a list of parts and materials suitable for use in the present invention:

| PARTS LIST: | |
|---|---|
| PART NUMBER | DESCRIPTION |
| 10 | restraint system |
| 11 | high pressure flow line/pipe line |
| 12 | pipe section |
| 13 | pipe section |
| 14 | coupling/hammer union/fitting/elbow/tee |
| 15 | hammer nut |
| 16 | projection |
| 17 | endless loop sling |
| 17A | first loop sling |
| 17B | second loop sling |
| 17C | third loop sling |
| 18 | cow hitch knot/girth hitch knot/sling hitch knot/knotted connection |
| 19 | arrow |
| 20 | first loop |
| 21 | second loop |
| 22 | arrow |
| 23 | shackle/disconnectable connector |
| 24 | bow |
| 25 | pin |
| 26 | wellhead |
| 27 | anchor |
| 28 | distance |
| 29 | sling assembly |
| 30 | arrow |
| 31 | loop end portion |
| 32 | loop end portion |
| 33 | open center |
| 34 | connection to anchor |
| 35 | hitch or half hitch knot |
| 36 | hitch or half hitch knot |
| 37 | hitch or half hitch knot |
| 38 | arrow |
| 39 | arrow |
| 41 | anchor |
| 42 | connection |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A restraint system for use in securing temporary flowlines that include multiple pipe sections, each pair of sections connected together with one or more fittings, the system comprising:
  a) an assembly of multiple endless loop slings connected end-to-end, each said sling having first and second sling end portions, said sling end portion secured to one or more of said other slings with a knotted connection;
  b) a plurality of disconnectable fittings that each join one assembly of multiple slings to another assembly of multiple slings;
  c) wherein the disconnectable fitting is not a said sling;
  d) the slings attached to the assembly of pipe sections and fittings with knots at spaced apart positions; and
  e) each knot formed by a portion of a said sling that encircles the temporary flowline at a position in between said first and second sling end portions.

2. The restraint system of claim 1 wherein the disconnectable fitting is a shackle.

3. The restraint system of claim 1 wherein the knot includes at least one 360° wrap of a said sling around a said pipe section.

4. The restraint system of claim 1 wherein each sling assembly includes multiple endless loop slings.

5. The restraint system of claim 1 wherein the said knot secures each endless loop sling assembly to the pipe section encircling the pipe next to a said fitting.

6. The restraint system of claim 4 wherein each sling assembly includes a sling that connects to two other said slings with first and second spaced apart cow hitch knots.

7. The restraint system of claim 1 wherein there are multiple spaced apart fittings and the assembly of endless loop slings encircles a pipe section multiple times in between two of said spaced apart fittings.

8. The restraint system of claim 1 wherein the assembly of endless loop slings encircles a said fitting multiple times and on opposing sides of said fitting.

9. The restraint system of claim 1 wherein the slings are of differing lengths.

10. The restraint system of claim 1 wherein the slings are of differing thicknesses.

11. A method for restraining a temporary flow line that includes multiple pipe sections, each pair of sections connected together with a disconnectable coupling to form a pipe assembly, comprising the steps of:
   a) providing first and second sling assemblies, each assembly comprising multiple endless sling loops connected to one another, each said sling having first and second sling ends;
   b) each sling assembly including at least three endless loop slings connected end to end, one of the endless loop slings being a middle sling that connects at spaced apart positions to the other said slings;
   c) the endless loop slings connected end to end connecting each plurality to another plurality with a disconnectable connector;
   d) the slings attached to the assembly of pipe sections and fittings with knots; and
   e) wherein each knot is formed by a portion of a said sling in between said first and second sling ends that encircles the flow line.

12. The method of claim 11 wherein the disconnectable connector is not a part of an endless sling.

13. The method of claim 11 wherein the connector is metallic.

14. The method of claim 11 wherein the connector is a shackle.

15. The method of claim 11 wherein the connector is a fitting having two parts, one part that disconnects from the other part.

16. A method for restraining a temporary flow line that includes multiple pipe sections, each pair of sections connected together with a disconnectable coupling, comprising the steps of:
   a) providing multiple connected endless loop slings, each endless loop sling having first and second sling ends;
   b) one or more of the endless loop slings connecting to another said sling with a disconnectable connector;
   c) knotting the slings to the flow line at intervals with spaced apart knots; and
   d) wherein each knot is formed by a portion of a said sling in between said first and second sling ends that encircles the flowline.

17. The method of claim 16 wherein the disconnectable connector is not a part of an endless sling.

18. The method of claim 16 wherein the connector is metallic.

19. The method of claim 16 wherein the connector is a shackle.

20. The method of claim 16 wherein the connector is a fitting having two parts, one part that disconnects from the other part.

21. The method of claim 16 wherein the slings are of differing lengths.

22. The method of claim 16 wherein the slings are of differing diameters.

23. The method of claim 16 wherein the slings are of a polyester material.

24. The method of claim 16 wherein the slings are of a synthetic fiber material.

\* \* \* \* \*